Patented Feb. 5, 1952

2,584,411

UNITED STATES PATENT OFFICE 2,584,411

PRODUCTION OF ALKALINE EARTH METAL HYDRIDES AND USE THEREOF IN REDUCING REFRACTORY OXIDES

Peter P. Alexander, Beverly, Mass., assignor to Metal Hydrides Incorporated, Beverly, Mass., a corporation of Massachusetts No Drawing. Application September 8, 1948, Serial No. 48,338

4 Claims. (Cl. 23—204)

This invention relates to the production of calcium hydride and its use in the reduction of refractory oxides and the production of other hydrides.

Calcium hydride has been produced by heating finely divided calcium oxide with magnesium in the presence of hydrogen to form a mixture of calcium hydride and magnesium oxide. It also has been produced by reacting metallic calcium in the form of ingots with hydrogen in a closed retort. In the latter case, the reaction must be carefully controlled to avoid excessive generation of heat with resulting fusion of the calcium ingots. It has been proposed to control the reaction by introducing the hydrogen into the retort in suitably regulated amounts either alone or mixed with an inert gas, such as helium or argon.

Calcium hydride is used extensively in the reduction of refractory oxides, such as oxides of titanium, chromium, etc. Thus, a charge comprising a finely divided intimate mixture of titanium oxide and calcium hydride is placed in a retort in a closed furnace and the furnace heated to a temperature of 900° C. to 1000° C. At this temperature the calcium hydride reacts with the titanium oxide with evolution of hydrogen to form a mixture of titanium metal and calcium oxide. By subjecting the furnace to vacuum the hydrogen may be removed as formed. If the hydrogen is not removed and the charge is permitted to cool in the presence of hydrogen, the titanium metal is converted to titanium hydride. In either case, the titanium or titanium hydride may be recovered as a powder by leaching with an acid to remove the calcium oxide.

In commercial practice in the reduction of a refractory oxide with calcium hydride, due to the heat insulating character of the charge, it is necessary to heat the retort and the outer portions of the charge to a much higher temperature than that necessary to promote the reaction in order to heat the interior portion of the charge to the temperature required. This excessive heating not only is expensive and time consuming but also tends to cause the finely divided particles of reduced metal in the outer portions of the charge to grow together and form undesirable flakes. This excessive heating also makes necessary the use of retorts of costly heat resistant alloys. The present invention makes possible a very substantial reduction in the amount of externally applied heat required and also the use of lower cost retorts, such as ordinary iron retorts.

The present invention is based upon the idea of utilizing the excessive heat generated when metallic calcium is reacted with hydrogen to effect new economies in the production and use of calcium hydride. In accordance with one aspect of the present invention, metallic calcium, preferably in powdered form, is intimately mixed with finely divided titanium dioxide and placed in a retort in a closed furnace. An excess of hydrogen is introduced and the furnace is heated to a temperature sufficient to initiate the reaction between the calcium and hydrogen. A temperature of about 500° C. is suitable. The reaction is strongly exothermic and proceeds without further externally applied heat. When the amount of calcium used is sufficient to produce the amount of calcium hydride theoretically required to react completely with the titanium oxide present, the exothermic heat produced internally is sufficient to raise the temperature of the charge uniformly to that required to start the reaction between calcium hydride and titanium dioxide which is between 800° C. and 900° C. Since the latter reaction is exothermic it proceeds to completion without further externally applied heat. The reactions may be represented by the following equations:

$$2Ca + 2H_2 \rightarrow 2CaH_2 + 91{,}760 \text{ cal.}$$
$$TiO_2 + 2CaH_2 \rightarrow TiH_2 + 2CaO + H_2$$
$$217{,}400 \text{ cal.} + 91{,}760 \text{ cal.} \quad 30{,}000 \text{ cal.} + 303{,}420 \text{ cal.}$$

The heat of formation of calcium hydride is 45,880 calories per molecule. Therefore, as soon as the temperature of the charge is brought to about 500° C. external heating of the furnace may be discontinued and the first reaction starts and produces an excess of heat and proceeds to completion without a supply of additional energy. The excess heat liberated by the reaction raises the temperature of the charge sufficient to start the second reaction. The second reaction produces an excess of 24,260 calories and, therefore, proceeds to completion without a supply of additional energy. The titanium hydride may be recovered as a finely divided powder by leaching the solid reduction product with an acid to remove the calcium oxide in any conventional manner.

The titanium oxide may be replaced by other metal oxides, such as the oxides of zirconium, tungsten, manganese, lithium, etc. If the metal of the metal oxide used is not a hydride forming metal, the reduction products are calcium oxide and the reduced metal of the metal oxide. The time required to complete both reactions is very short once the temperature has been raised to that required to start reaction between hydrogen and calcium since the heat required to complete the reactions is generated in situ.

In the practice of the invention sufficient hydrogen is introduced into the furnace to react with all the calcium used and to maintain a pressure slightly greater than atmospheric pressure to assure a reducing atmosphere. The temperature to which the charge is raised as a result of the reaction between calcium and hydrogen may be controlled by the amount of calcium used, Thus, this temperature may be increased by using an amount of calcium substantially greater than the amount theoretically required to react completely with the metal oxide used. This temperature also may be increased by externally applied heat to raise the temperature of the furnace initially substantially above that required to start reaction between calcium and hydrogen but substantially below that required to start reaction between calcium hydride and the metal oxide used.

The invention particularly contemplates the production of calcium hydride and the utilization of the heat produced in its formation to raise the temperature of the charge sufficiently high to start reaction between calcium hydride and a metal oxide, which reacts therewith exothermically, that is, in which the sum of the heats of formation of calcium hydride and the metal oxide is less than the heats of formation of the products resulting from the reaction. The invention is applicable with other alkaline earth metals, such as barium and strontium. Also, metal oxides, such as thorium oxide, may be used which do not react exothermically with the alkaline earth metal hydride. Thus, by controlling the temperature of the charge as previously described, such as by increasing the amount of alkaline earth metal used, sufficient energy may be generated to carry to completion the reaction between an alkaline earth metal hydride and a metal oxide which does not react exothermically with such hydride.

Thus, the invention provides a method whereby an alkaline earth metal hydride is produced and a metal oxide is reduced in a single operation utilizing the heats of the reactions in a most efficient manner. The required temperature of the furnace, due to externally applied heat, may be as much as four to five hundred degrees centigrade less than theretofore required for the reduction of refractory oxides. This, in addition to the great saving in fuel required, makes possible the use of lower cost retorts, such as ordinary iron retorts, instead of retorts of costly heat resistant alloys.

I claim:

1. In the reduction of metal oxides by heating a mixture of an alkaline earth metal hydride and the metal oxide in a confined reaction zone, the improvement which comprises confining an intimate finely divided mixture of the metal oxide and an alkaline earth metal in the reaction zone, introducing hydrogen into the reaction zone, and applying heat externally to the reaction zone in amount to raise the temperature of the charge to a temperature sufficient to start reaction between the hydrogen and alkaline earth metal but less than that required to start reaction between the metal oxide and a hydride of the alkaline earth metal whereby the hydrogen is caused to react with the alkaline earth metal distributed throughout the charge to form the hydride of the alkaline earth metal and thereby cause exothermic heat to be generated internally at a multiplicity of points distributed uniformly in the charge in amount to raise the temperature of the charge to that at which the alkaline earth metal hydride reacts with said oxide.

2. In the reduction of metal oxides by heating a mixture of calcium hydride and the metal oxide in a confined reaction zone, the improvement which comprises confining an intimate finely divided mixture of the metal oxide and calcium metal in the reaction zone, introducing hydrogen into the reaction zone, and applying heat externally to the reaction zone in amount to raise the temperature of the charge to a temperature sufficient to start reaction between the hydrogen and calcium metal but less than that required to start reaction between the metal oxide and calcium hydride whereby the hydrogen is caused to react with the calcium metal distributed throughout the charge to form calcium hydride and thereby cause exothermic heat to be generated internally at a multiplicity of points distributed uniformly in the charge in amount to raise the temperature of the charge to that at which calcium hydride reacts with said oxide.

3. In the reduction of metal oxides by heating a mixture of an alkaline earth metal hydride and the metal oxide in a confined reaction zone, the improvement which comprises confining an intimate finely divided mixture of the metal oxide and an alkaline earth metal in the reaction zone, introducing hydrogen into the reaction zone, and applying heat externally to the reaction zone in amount to raise the temperature of the charge to a temperature sufficient to start reaction between the hydrogen and alkaline earth metal but less than that required to start reaction between the metal oxide and a hydride of the alkaline earth metal whereby the hydrogen is caused to react with the alkaline earth metal distributed throughout the charge to form the hydride of the alkaline earth metal and thereby cause exothermic heat to be generated internally at a multiplicity of points distributed uniformly in the charge in amount to raise the temperature of the charge to that at which the alkaline earth metal hydride reacts with said oxide, said metal oxide being the oxide of a metal selected from the group consisting of zirconium, titanium, chromium, tungsten, manganese and thorium.

4. In the reduction of metal oxides by heating a mixture of calcium hydride and the metal oxide in a confined reaction zone, the improvement which comprises confining an intimate finely divided mixture of the metal oxide and calcium metal in the reaction zone, introducing hydrogen into the reaction zone, and applying heat externally to the reaction zone in amount to raise the temperature of the charge to a temperature sufficient to start reaction between the hydrogen and calcium metal but less than that required to start reaction between the metal oxide and calcium hydride whereby the hydrogen is caused to react with the calcium metal distributed throughout the charge to form calcium hydride and thereby cause exothermic heat to be generated internally at a multiplicity of points distributed uniformly in the charge in amount to raise the temperature of the charge to that at which calcium hydride reacts with said oxide, said metal oxide being the oxide of a metal selected from the group consisting of zirconium, titanium, chromium, tungsten, manganese and thorium.

PETER P. ALEXANDER.

REFERENCES CITED

The following references are of record in the file of this patent:

UNITED STATES PATENTS

| Number | Name | Date |
|---|---|---|
| 857,146 | Askenasy et al. | June 18, 1907 |
| 2,082,134 | Alexander | June 1, 1937 |
| 2,378,368 | Alexander | June 12, 1945 |
| 2,427,338 | Alexander | Sept. 16, 1947 |